(12) United States Patent
Moosavi et al.

(10) Patent No.: US 11,362,794 B2
(45) Date of Patent: Jun. 14, 2022

(54) DETERMINING A RELATIONSHIP BETWEEN A FIRST AND A SECOND NODE

(71) Applicant: Telefonaktiebolaget LM Ericsson (publ), Stockholm (SE)

(72) Inventors: Reza Moosavi, Linköping (SE); Fredrik Gunnarsson, Linköping (SE); Martin Hessler, Linköping (SE); Pradeepa Ramachandra, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/300,677

(22) PCT Filed: May 13, 2016

(86) PCT No.: PCT/EP2016/060887
§ 371 (c)(1),
(2) Date: Nov. 12, 2018

(87) PCT Pub. No.: WO2017/194166
PCT Pub. Date: Nov. 16, 2017

(65) Prior Publication Data
US 2019/0288822 A1 Sep. 19, 2019

(51) Int. Cl.
*H04L 5/00* (2006.01)
*H04B 17/336* (2015.01)
(Continued)

(52) U.S. Cl.
CPC ......... *H04L 5/0073* (2013.01); *H04B 17/336* (2015.01); *H04L 5/0051* (2013.01);
(Continued)

(58) Field of Classification Search
CPC ... H04L 5/0073; H04L 5/0051; H04B 17/336; H04W 36/00835; H04W 24/10; H04W 24/02
(Continued)

(56) References Cited

U.S. PATENT DOCUMENTS 8,437,752 B2 5/2013 Flore et al.
9,860,849 B1 * 1/2018 Naim .................... H04W 52/04
(Continued)

FOREIGN PATENT DOCUMENTS

CN 103959700 A 7/2014
CN 104009947 A * 8/2014
(Continued)

OTHER PUBLICATIONS

Huawei, "Use Case of Coverage Optimization", R2-100171, 3GPP TSG-RAN WG2#68bis, Jan. 18-22, 2010, Valencia, Spain (Year: 2010).*
(Continued)

*Primary Examiner* — Kwang B Yao
*Assistant Examiner* — Xuan Lu
(74) *Attorney, Agent, or Firm* — Christopher & Weisberg, P.A.

(57) ABSTRACT

It is provided a method for determining a relationship between a first node and at least one second node each serving one different or the same wireless communication network, the method comprising the steps of detecting pilot contamination; and determining a relationship between the first node and at least one of the second nodes based on the detected pilot contamination.

16 Claims, 9 Drawing Sheets

(51) Int. Cl.
*H04W 24/10* (2009.01)
*H04W 36/00* (2009.01)
*H04W 24/02* (2009.01)

(52) U.S. Cl.
CPC ..... *H04W 24/10* (2013.01); *H04W 36/00835* (2018.08); *H04W 24/02* (2013.01)

(58) Field of Classification Search
USPC ........................................................ 370/329
See application file for complete search history.

(56) References Cited

U.S. PATENT DOCUMENTS

| | | | |
|---|---|---|---|
| 2005/0020203 A1* | 1/2005 | Losh | H04W 36/00837 455/11.1 |
| 2009/0129291 A1* | 5/2009 | Gupta | H04W 8/26 370/254 |
| 2010/0111021 A1* | 5/2010 | Hui | H04W 72/04 370/329 |
| 2012/0028664 A1* | 2/2012 | Zhang | H04W 16/14 455/501 |
| 2012/0106390 A1* | 5/2012 | Guo | H04W 72/1231 370/252 |
| 2013/0114450 A1* | 5/2013 | Xu | H04W 72/0426 370/336 |
| 2014/0177486 A1* | 6/2014 | Wang | H04L 5/0053 370/280 |
| 2014/0314005 A1* | 10/2014 | Sagong | H04L 5/005 370/329 |
| 2014/0376464 A1 | 12/2014 | Nam et al. | |
| 2015/0373648 A1* | 12/2015 | Yang | H04W 52/346 455/522 |
| 2016/0330645 A1* | 11/2016 | Mishra | H04W 28/0273 |
| 2016/0373985 A1* | 12/2016 | Bengtsson | H04W 72/0406 |
| 2017/0317731 A1* | 11/2017 | Chen | H04W 72/04 |
| 2018/0254849 A1* | 9/2018 | Kela | H04W 72/00 |

FOREIGN PATENT DOCUMENTS

| | | | | |
|---|---|---|---|---|
| CN | 104009947 A | | 8/2014 | |
| CN | 104735792 A | * | 6/2015 | ............ H04W 16/10 |
| CN | 104735792 A | | 6/2015 | |
| CN | 105187100 A | * | 12/2015 | ........... H04B 17/309 |
| CN | 105187100 A | | 12/2015 | |
| KR | 2016052374 A | * | 5/2016 | ............ H04B 7/0413 |
| KR | 1020160052374 A | | 5/2016 | |
| WO | WO-2009079830 A1 | * | 7/2009 | ............ H04W 24/10 |
| WO | 2015193446 A1 | | 12/2015 | |
| WO | 2016036158 A1 | | 3/2016 | |

OTHER PUBLICATIONS

Dahlen, Anders, et al., "Evaluations of LTE Automatic Neighbor Relations", 2011 IEEE 73rd Vehicular Technology Conference (VTC Spring), May 15-18, 2011, 1-5.

Chinese Office Action with English Summary Translation dated Sep. 9, 2020 for Patent Application No. 201680087614.5, consisting of 14-pages.

Indian Office Action dated Feb. 23, 2021 for Patent Application No. 201847042614, consisting of 6-pages.

3GPP TSG-RAN WG2 #68bis R2-100171; Title: Use Case of Coverage Optimization; Agenda Item: 4.3.1; Source: Huawei; Document for: Discussion and Approval; Date and Location: Jan. 18-22, 2010, consisting of 3-pages.

* cited by examiner

DETERMINING A RELATIONSHIP BETWEEN A FIRST AND A SECOND NODE

TECHNICAL FIELD

The present invention relates to a method for determining a relationship between a first node and at least one second node each serving different or the same wireless communication network by determining a relationship between the first and the second nodes based on a detected pilot contamination, and relates further to a wireless communication device adapted to detecting the pilot contamination, to a node adapted to determining the relationship to the second node based on the detected pilot contamination, and to a system comprising the above wireless communication device and the above nodes.

BACKGROUND

Recent developments in mobile communications are aimed at reducing overhead in network communication. That is also known as ultra-lean design in the 5G standard development. That is to say, permanent transmission of signals in the network should be avoided in future systems.

This implies that permanent transmission of signals or always-on-signals from the network should be avoided where possible. This will lead to significantly lower network energy consumption, better scalability, higher degree of forward compatibility during the radio access technology RAT evolution phase, lower interference from system overhead signals and consequently higher throughput in low load scenarios, and improved support for user centric beamforming.

In order for smooth operations of mobility procedure in future systems, also known as next generation radio access technology RAT or in short NX technology, a list of neighboring NX nodes needs to be provided where neighboring NX nodes may for instance be handover candidates for the wireless communication devices, or may for instance be regional neighbors, or may be nodes transmitting signals potentially causing interference under specific circumstances. Thus, the list of neighboring nodes may for instance be used for handover procedures of wireless communication devices, and may for instance be used for reducing interference between signals transmitted to and from the nodes, and so on.

In current technology, for instance according to the Long-Term-Evolution LTE standard, such a neighbor relations table may be established by using the always-on-signals from the neighboring node which is well studied under the ANR Automatic Neighbor Relations concept.

However, mobile data traffic is growing rapidly due to the enormous success of mobile communication devices such as smart phones, tablets and other data traffic appliances or mobile terminals. The conventional way for increasing the data rate has been to increase the transmission bandwidth. However, the spectrum has become scarce due to the increase in wireless access systems. Thus, in order to deal with increased wireless data traffic more base stations are deployed and the cellular network is densified.

That is, base stations may be added to the network system anytime during operation and may even be mobile to serve the user better. As a result, the network communication system may be more dynamic than current network communication systems and using a neighbor relation table according to the prior art may use more resources than available according to the ultra-lean design of future network communication systems.

Therefore there is the need to reduce the resources used for determining a relationship between a first node and at least one second node.

SUMMARY

The above-mentioned problems and drawbacks of the conventional methods are solved by the subject matter of the independent claims. Further preferred embodiments are described in the dependent claims.

According to an aspect of the present invention there is provided a method for determining a neighbouring relationship between a first node and at least one second node each serving different or the same wireless communication network, the method comprising the steps of: detecting pilot contamination; and determining a relationship between the first node and at least one of the second nodes based on the detected pilot contamination.

According to another aspect of the present invention, there is provided a wireless communication device adapted to detecting pilot contamination between a first node and at least one second node each serving different or the same wireless communication network.

According to another aspect of the present invention, there is provided a node adapted to determining a neighbouring relationship to at least one second node serving a different or the same wireless communication network as the node, further adapted to: receiving information on a detected pilot contamination; and determining a relationship between the node and at least one of the second nodes based on the detected pilot contamination.

According to another aspect of the present invention there is provided a system comprising the wireless communication device adapted to detecting pilot contamination between a first node and at least one second node, and the node adapted to determining a neighbouring relationship to at least one second node serving based on the detected pilot contamination.

According to another aspect of the present invention a computer program is provided that comprises code, the code, when executed on processing resources, instructs the processing resources to perform a method embodiment of the present invention.

According to yet another aspect of the present invention a computer program product is provided that stores code, the code when executed on processing resources, instructs the processing resources to perform a method of the embodiment of the present invention.

BRIEF DESCRIPTION OF THE DRAWINGS

Embodiments of the present invention which are presented for a better understanding of the inventive concepts but which are not to be seen as limiting the invention will now be described with reference to the figures in which.

DETAILED DESCRIPTION

Figure 1:
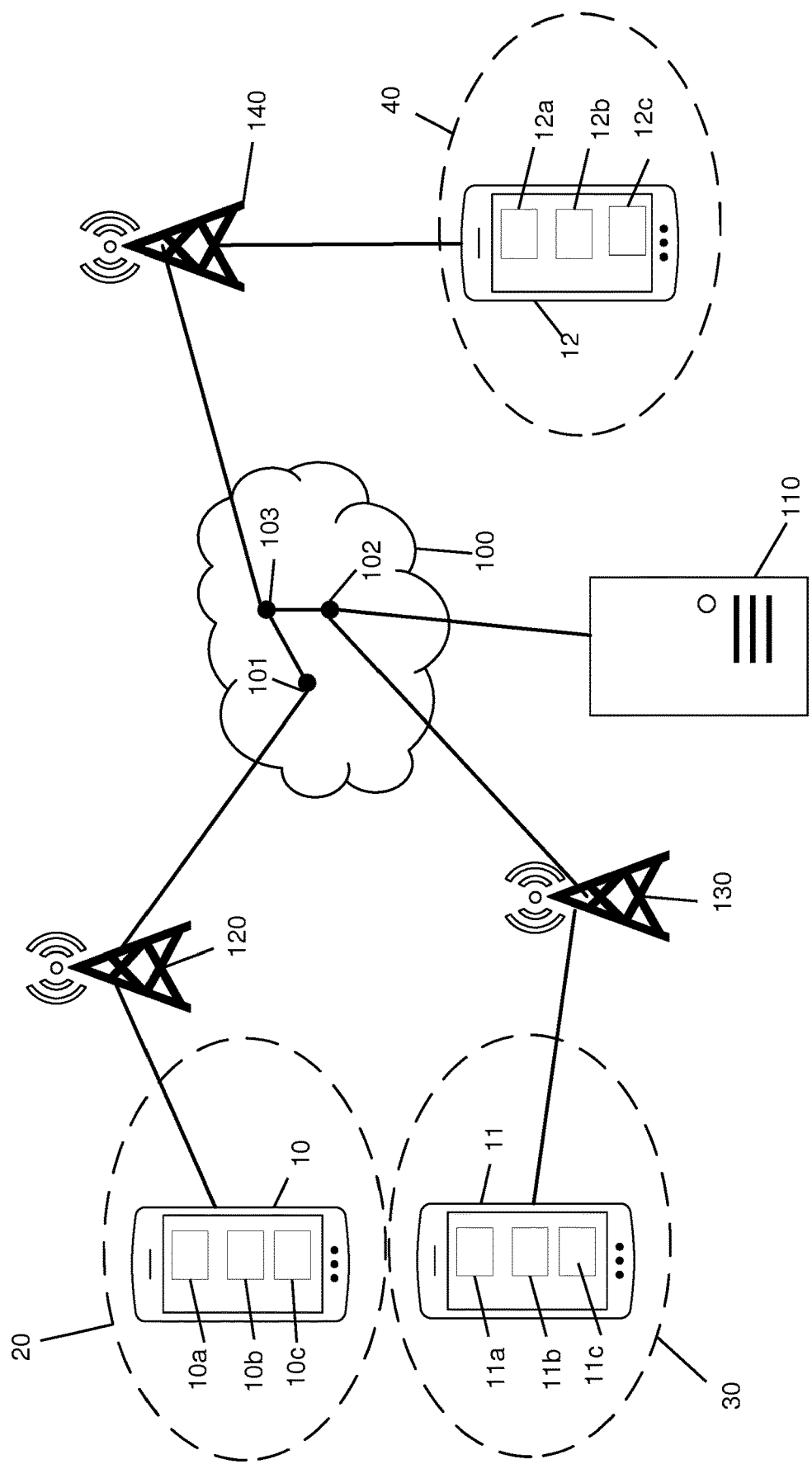
FIG. 1 shows a schematic overview of an exemplary network environment in which a relationship between a first node and at least one second node is determined according to one embodiment of the present invention.

FIG. 1 shows a schematic overview of an exemplary network environment in which a relationship between a first node and at least one second node is determined according to one embodiment of the present invention.

A network 100, for instance a mobile communication network, includes a number of network elements 101-103 such as network nodes, routers, gateways, switches, switching centers, base stations, wireless or wire bound links, and the like. In general, the purpose of the network 100 will be to provide a network 100 service to a plurality of wireless communication devices 10 such as mobile terminals, user equipment, and the like. Such services include telephone, video telephone, chatting, Internet browsing, email access and the like.

For this purpose the network elements 101-103 will convey data via base stations 120, 130, 140, serving cells 20, 30, 40, to and from the plurality of wireless communication devices 10, 11, 12. The base stations 120, 130, 140 may be connected to the individual wireless communication devices 10, 11, 12 via usual radio links for transmitting and receiving data to and from a wireless communication device 10, 11, 12.

The network 100 may further have a connection to some sort of network entity 110, such as a server or a resource in a data center.

Mobile data traffic is growing exponentially due to the success of smart phones, tablets and other data traffic appliances. The conventional way for increasing the data rate has been to increase the transmission bandwidth. However, the spectrum has become scarce due to the increase in wireless access systems. One way of handling the increased wireless data traffic may be to deploy more base stations and densify the cellular network. This would however increase interference and deployment cost. Another, seemingly simpler in terms of deployment cost, option for increasing the data rate may be to introduce large antenna arrays at the base station. The base station, having excessive number of antennas, may simultaneously schedule multiple terminals at the same time/frequency band with simple linear processing such as maximum-ratio transmission (MRT) or zero-forcing (ZF) in the downlink and maximum-ratio combining (MRC) or ZF in the uplink. This may be often referred to as very large (VL) multi-user (MU) multiple-input-multiple-output (MIMO) or massive MIMO and may be referred to as VL-MIMO or Massive-MIMO hereafter. Distinctive aspects of VL-MIMO systems (i) channel hardening, (iii) channel sounding and (iii) pilot contamination may be considered in the following.

Using many antennas at the base station along with appropriately chosen precoding may result in an effective channel between the base station and the wireless communication device that may be independent of the small scale fading and in particular may look flat over frequency. This may be referred to as channel hardening.

According to experiments carried out by the applicant, described below with respect FIG. 5, it can be established that in systems deploying massive number of antennas, the channel after exploiting a good precoder is almost flat and does not vary with time or frequency.

Conventionally, each wireless communication device, with respect to the pilot symbols transmitted during downlink phase, may estimate the channel gain and may feed it back to the base station via a reverse link. Since the number of required pilots in the downlink is proportional to the number of base station antennas, these schemes for obtaining CSI might require a fair amount of signaling overhead. Therefore it may be better to operate in the time-division duplex (TDD) mode and rely on the channel reciprocity between the uplink and the downlink. More precisely, each wireless communication device may transmit sounding symbols in the uplink phase which may then be used by the base station to estimate the channel. The amount of required pilots may be thus equal to the number of wireless communication devices which is typically much smaller than the number of base station antennas. This may be reminiscent of sounding reference signal (SRS) transmission in LTE. The pilot signals may be referred to reciprocity reference signals (RRS).

In order to operate the network, it has to be determined a relationship between nodes such as the base stations 120, 130, 140 which may be newly added, i.e deploying a new base station in one area, established, i.e. updating the base station relations in an established network, or moving. The present embodiment provides a network environment that is configured such that a relationship between the first node and at least one second node may be determined using a low network overhead, i.e. without using always-on signals, as explained in greater detail below.

Generally, in one embodiment of the present invention the wireless communication devices 10, 11, 12 may be connected to different network elements 101-103 and base stations 120, 130, 140 in the usual manner. Each wireless communication device 10, 11, 12 is transmitting sounding symbols in a uplink phase which are then used by the base stations 120, 130, 140 to estimate their corresponding radio channels. The amount of required pilot signals is thus equal to the number of wireless communication devices, these pilot signals may be referred to as reciprocity reference signals, RRS.

However, this may lead to pilot contamination. This happens if the same pilot is used by any of the wireless communication devices in neighboring cells 20, 30, 40, i.e. cells which can be handover candidates for the wireless communication devices 10, 11, 12. In case of pilot contamination, the channel estimates of the wireless communication devices using the same pilot may be contaminated with each other. This may cause interference and performance degradation. In other words, pilot contamination may occur when two wireless communication devices use the same uplink reference signal, i.e. two uplink reference signals being non-orthogonal. Therefore, there have been efforts in the past to detect pilot contamination in order to be able to subsequently suppress pilot contamination. Thus, detecting pilot contamination is well known.

However, once pilot contamination is detected it is possible according to the present embodiment of the invention to determine the relationship between the first node, e.g. base station 120, and at least one of the second nodes, e.g. base stations 130, 140, based on the detected pilot contamination.

When new NX nodes are introduced in an existing LTE network, the NX nodes either (a) may need to be directly configured by the Operations and Management OAM system or (b) may need to transmit additional system/node information related reference signals, in order to establish base station relations. In the former case, i.e. OAM based planning, the planning tool may need to be very advanced and/or complex in order to e.g. consider the beam forming capabilities of all the NX nodes, the propagation environments of their deployment etc. In the latter case, i.e. additional system/node information reference signal transmission, the ultra-lean design principle of NX technology may be violated.

Additionally, as the network evolves for instance new nodes may be deployed in the existing serving area, or the propagation environment may change, the old node relations may become outdated and in some cases even may no longer be valid. The problem is further aggregated when new possibly mobile base stations are introduced in NX, for example, when buses carry base-stations to better serve the passengers. Hence, a method for establishing these neighbor relations is desirable, which is as automated as much as possible but still keeps any new reference signal transmissions needed therefore to a minimum.

In other words, in one embodiment of the present invention it is disclosed how to use pilot contamination detection to perform NX neighbor relation generation. This is possible since pilot contamination may happen whenever a base station 120, 130, 140 can overhear the transmission of a single or multiple sounding signals from a single or multiple unintended wireless communication devices, i.e. communication devices served by other nodes such as base stations 120, 130, 140. If the unintended wireless communication devices reside in nodes such as base stations 130 other than the said base station 120, then this may imply that there may be a neighbor relation between the base station 120 and the other node such as base station 130.

In other words, in one embodiment the wireless communication device 10 served by the base station 120 may detect pilot contamination caused by the wireless communication device 11 served by the base station 130 using the same uplink pilot signal as the wireless communication device 10. Subsequently, a relationship between the base station 120 and the base station 130 may be determined based on the detected pilot contamination by the wireless communication device 10. That is, it may be determined that the base station 120 is a neighboring node to the base station 130, i.e. base station 130 may be a candidate node for handover from base station 120.

On the other hand, base station 140 is a node not neighboring to the first node, i.e. base station 120. Therefore, the wireless communication device 12 may use the same pilot signal as the wireless communication device 10 without causing pilot contamination. Therefore, it is not determined for base station 140 that it is neighboring to base station 120.

According to at least one embodiment of the present invention, the ANR generation may be performed without interrupting any ongoing services, i.e. a Self-Organizing Network, SON, feature. There may be no need for any additional pilot transmissions. Additionally the knowledge obtained when applying the embodiment of the present invention may be used to avoid pilot contamination in future. In a deployment where the topology of base stations 120, 130, 140 changes quickly the benefits may be greater yet, as the system may operate as normal until pilot contamination occurs and any always on proactive mechanism to maintain a constantly changing ANR map for the mobile base stations may be avoided.

In one embodiment of the present invention the method further comprises determining whether the detected pilot contamination is caused by a wireless communication device using the same uplink pilot signal. However, there may be other procedures to detect pilot contamination.

In one embodiment of the present invention the relationship between the second node and the first node may be determined as a neighboring relationship. That is, a neighboring node may be a node eligible for handover for example.

In one embodiment pilot contamination may be detected by detecting an effect of the pilot contamination by mobile communication device or a node connected to a wireless communication network. That is an effect on the downlink signal transmitted by the first node, e.g. base station 120.

In one embodiment the method may further comprise a step of reporting detection of the pilot contamination or the effect of pilot contamination to the wireless communication network 100. That is, the pilot contamination may be reported to a node connected to the wireless communication network, for instance when wireless communication device 10 detects pilot contamination it may report to its serving base station 120.

In yet another embodiment of the present invention the step of determining a relationship between the first node, i.e. base station 120, and the at least one second node, i.e. base station 130, comprises obtaining information about the first node, i.e. base station 120, obtaining information about the wireless communication device 11 using the same uplink pilot signal served by the at least one second node, i.e. base station 130. The wireless communication device may be of at least one of the second nodes, i.e. base stations 130, 140, using the same uplink pilot signal served by the at least one second node. Subsequently, the relationship between the first node, i.e. base station 120, and the at least one of the second nodes, i.e. base station 130, 140, may be determined based on the information about the first node, a base station 120, and on the information about the wireless communication device 11 using the same uplink pilot signal served by the at least one second node, i.e. base station 130.

In one embodiment of the present invention information about the first node, i.e. base station 120, and information about the wireless communication device 11 using the same uplink pilot signal includes time of arrival of pilot signals transmitted by the wireless communication devices 10, 11 using the same pilot signals.

Figure 2:
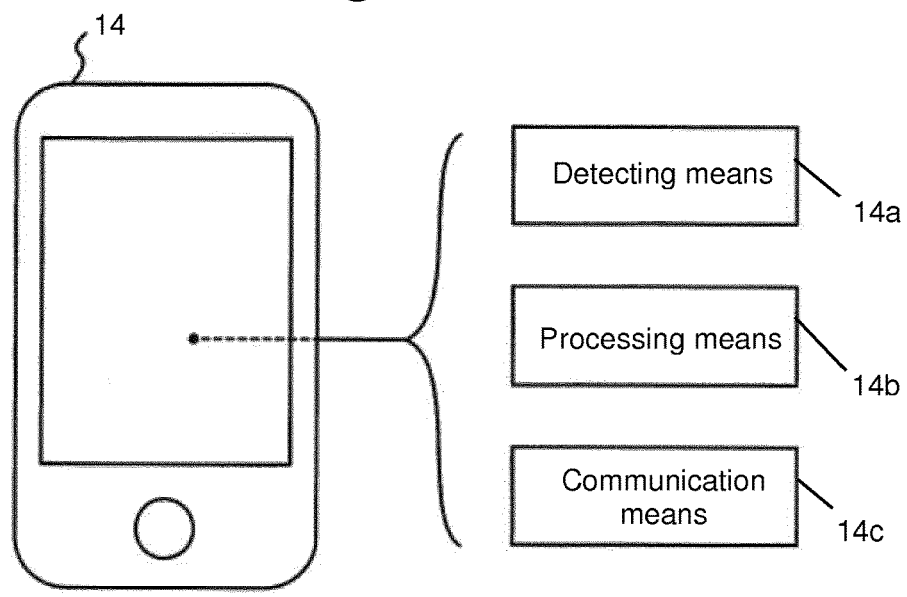
FIG. 2 shows an exemplary wireless communication device according to one embodiment of the present invention.

FIG. 2 shows an exemplary wireless communication device according to one embodiment of the present invention. In one embodiment of the present invention the wireless communication device 14 detects the pilot contamination using detecting means 14a. The wireless communication device 14 may further be adapted to detect any effect indicative of a pilot contamination such as a not flattened channel for instance by looking at the average channel gain over the transmission bandwidth. Thus the wireless communication device 14 may be provided with processing means 14b in order to process information about the pilot contamination for instance to determine from a not flattened channel the presence of pilot contamination. The wireless communication device 14 may further be adapted to report the detected pilot contamination to the wireless communication network 100 using communication means 14c.

The wireless communication devices 10, 11, 12 depicted in FIG. 1 may or may not be provided with detecting means, processing means, and communication means respectively. However, in order to carry out the method according to the present embodiment at least the wireless communication device 10 should be provided with detecting means 10a in order to detect any pilot contamination.

Figure 3:
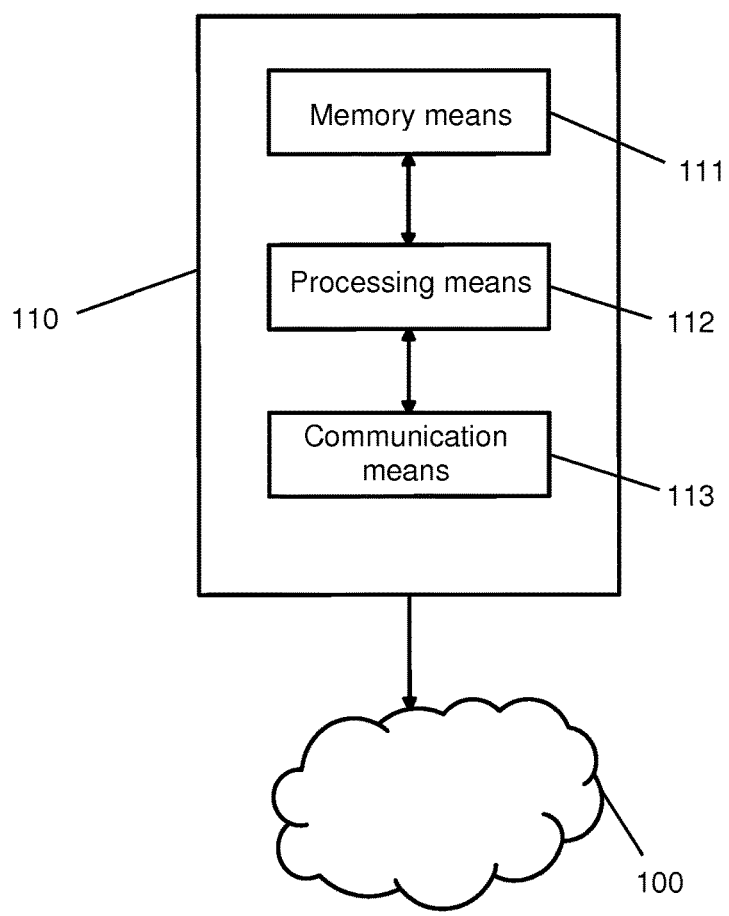
FIG. 3 shows a general entity embodiment according to the present invention for determining a relationship between the first node and at least one second node.

FIG. 3 shows a general entity embodiment according to the present invention for determining a relationship between the first node and at least one second node.

In one embodiment of the present invention the network entity 110 may be adapted to perform the step of determining a relationship between the first node and at least one of the second nodes based on the detected pilot contamination. Thus, the network entity 110 is provided with communication means 113 in order to be able to communicate with the network 100 and receive information on any detected pilot contamination from wireless communication devices 10, 11, 12. The network entity may further be provided with processing means 112 in order to perform the step of determining a relationship between the first node and at least one of the second nodes. Any information needed in order to process the step of determining a relationship between the first node and the second node may be stored in memory means 111 of the network entity 110.

Figure 4:
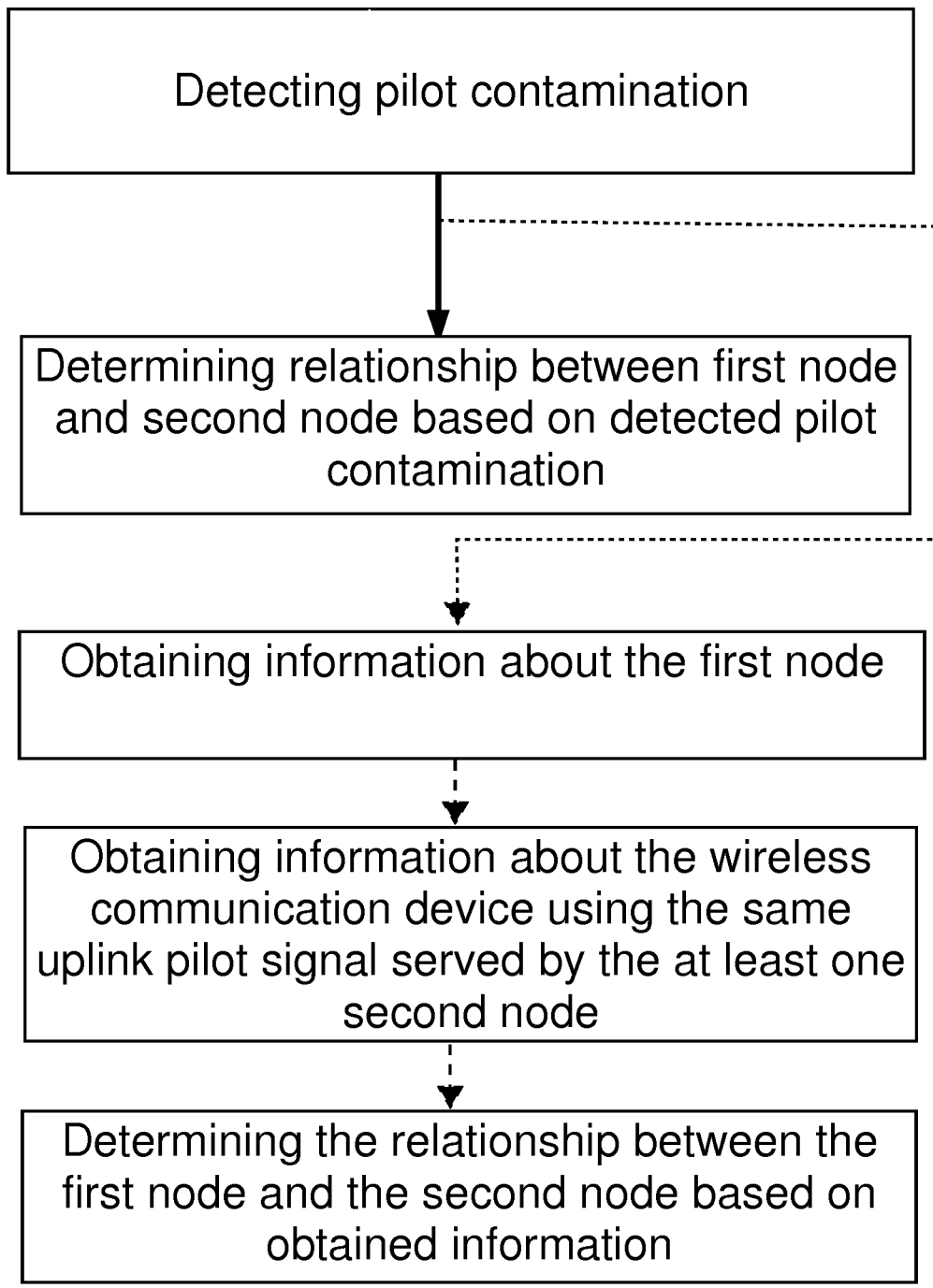
FIG. 4 shows a schematic overview of a method determining a relationship between a first node and at least one second node according to one embodiment of the present invention.

FIG. 4 shows a schematic overview of a method determining a relationship between a first node and at least one second node according to one embodiment of the present invention.

In one embodiment of the present invention the method for determining a relationship between the first node and at least one second node includes detecting pilot contamination. Detecting pilot contamination may be carried out by detecting a not flattened channel for instance by looking at the average channel gain over the transmission bandwidth.

The method according to the present embodiment may further comprise determining a relationship between the first node and the second node based on the detected pilot contamination. The step of determining the relationship may further include a step of determining whether the detected pilot contamination is caused by a wireless communication device using the same uplink pilot signal.

The step of determining the relationship may further comprise obtaining information about the first node, obtaining information about the wireless communication device using the same uplink pilot signal served by the at least one second node, and determining the relationship between the first node in the second node based on the obtained information.

Generally, the mentioned processing means 112 of the network entity 110 may be a processing unit, a processing unit collection, CPU, a share of a data/processing center and so on.

The memory means 111 of the network entity 110 may specifically store code instructing the processing means 112 to implement a method embodiment of the present invention. Particularly the memory means 111 may store code instructing the processing means 112 during operation to determine a relationship between the first node and at least one of the second nodes based on the detected pilot contamination.

For instance in one embodiment of the present invention the communication means 113 of the network entity 110 may connect to the network 100. Through the communication means 113 the network entity 110 may receive a signal indicating pilot contamination. However, there may be more than one communication means to separately receive the signal indicating the pilot contamination and to transmit information indicating the detected pilot contamination.

Further, in one embodiment of the present invention the communication means 113 may be connected to several entities apart from the network 100 in order to receive the signal indicating the pilot contamination.

In one embodiment the present invention relates to recent technology trends that are of particular interest in the 5G context. The invention is however applicable also in further development of the existing mobile broadband systems such as Wideband Code Division Multiple Access, WCDMA, and LTE. Some of the relevant technology trends are briefly discussed in the following.

One design principle currently under consideration for 5G is to base it on an ultra-lean design. This may imply that "always on signals" should be avoided from the network as much as possible. The expected benefit from this design principle is expected to be the significantly lower network energy consumption, better scalability, higher degree of forward compatibility during the RAT evolution phase, lower interference from system overhead signals and consequently higher throughput in low load scenario, and improved support for user centric beam-forming.

In order for smooth operations of the mobility procedure in NX, the NX node may need to have a concrete list of neighboring NX nodes which can be handover candidates for the wireless communication device or user equipment UEs. In LTE, such a neighbor relations table can be established by using the always on signals from the neighboring node which is well studied under the ANR Automatic Neighbor Relations concept.

Being a new technology, NX will most likely be introduced by the operators amongst their existing LTE network to begin with. In this way, the operator could potentially distribute the capital expenditure CAPEX over time and at the same time gradually shift their network to the new radio access technology.

Mobile data traffic is growing rapidly due to the enormous success of smart phones, tablets and other data traffic appliances. The traditional way for increasing the data rate has been to increase the transmission bandwidth. However, the spectrum has become scarce due to the increase in wireless access systems. One way of handling the increased wireless data traffic may be to deploy more base stations and densify the cellular network. This would however increase interference and deployment cost. Another, seemingly simpler in terms of deployment cost, option for increasing the data rate may be to introduce large antenna arrays at the base station. The base station, having excessive number of antennas, can simultaneously schedule multiple terminals at the same time/frequency band with simple linear processing such as maximum-ratio transmission (MRT) or zero-forcing (ZF) in the downlink and maximum-ratio combining (MRC) or ZF in the uplink. This may be referred to as very large (VL) multi-user (MU) multiple-input-multiple-output (MIMO) or massive MIMO and may be abbreviated by VL-MIMO or Massive-MIMO hereafter.

Two distinctive aspects of VL-MIMO systems: (i) channel hardening, (iii) channel sounding and (iii) pilot contamination are considered.

Using many antennas at the base station along with appropriately chosen precoding may result in an effective channel between the base station and the UE that may be independent of the small scale fading and in particular looks flat over frequency. This may be referred to as channel hardening.

To see the impact of the number of antennas on the channel variations, an experiment was conducted by the inventors. Considering a multiple-input single-output (MISO) system with M transmit antennas and assuming MRT, then mathematically, the received signal can be expressed by $$\sqrt{P}hwq+e,$$

where P is the transmitted power, h denotes the M×1 channel vector and $$w = \frac{h^*}{\|h\|}$$

is the 1×M MRT precoder, q is the unit-energy transmitted symbol and e is zero-mean additive white Gaussian noise with variance $\sigma^2$. It can be easily shown that the averaged received SNR scales as M. However, the SNR variations around the mean depend heavily on the number of antennas M and will decrease as M increases. This can be seen from FIG. 5 where the averaged received SNR as well as the maximum and the minimum received SNR for 100000 random channel realizations are plotted versus the number of antennas.

Figure 5:
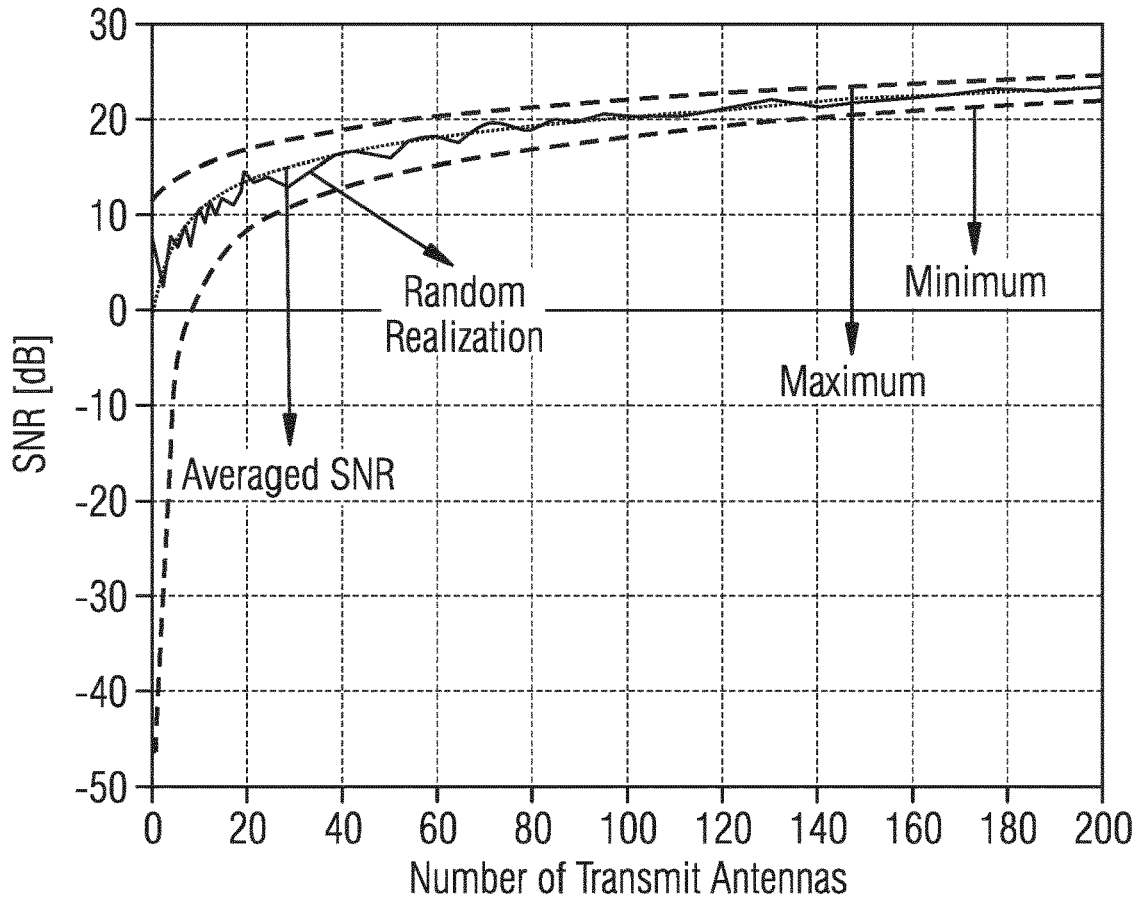
FIG. 5 shows an exemplary illustration of the received signal to noise ratio SNR as a function of the number of transmit antennas for a general Multiple Input Single Output system.

In FIG. 5, the transmitted SNR is set to 1, i.e.

$$\frac{P}{\sigma^2} = 1$$

and fast Rayleigh fading is assumed where the elements of h are circularly symmetric Gaussian random variables with mean zero and variance 1. For illustration, the instantaneous received SNR for a random channel realization is also plotted. As one can see, the averaged SNR increases linearly as M increases and moreover the SNR variations around the mean decrease with M. Similar observations can be seen with ZF precoding. This confirms the fact that in systems deploying massive number of antennas, the channel after exploiting a good precoder is almost flat and does not vary with time or frequency.

Conventionally, each wireless communication device, or user equipment UE, thanks to the pilot symbols transmitted during downlink phase, may estimate the channel gain and may feed it back to the base station via a reverse link. Since the number of required pilots in the downlink is proportional to the number of base station antennas, these schemes for obtaining CSI might require a fair amount of signaling overhead.

The idea may be therefore to operate in the time-division duplex (TDD) mode and rely on the channel reciprocity between the uplink and the downlink. More precisely, each UE may transmit sounding symbols in the uplink phase which are then used by the base station to estimate the channel. The amount of required pilots may be thus equal to the number of UEs which is typically much smaller than the number of base station antennas. This may be reminiscent of sounding reference signal (SRS) transmission in LTE. The pilot signals may be often called reciprocity reference signals RRS in 5G context.

This, on the other hand, may introduce a new challenge known as pilot contamination. The problem may be due to the fact that since the same pilots might be used by the UEs in the neighboring cells, the channel estimates might be contaminated with the other UEs in the neighboring cells. This may cause interference and performance degradation and has to be combated. There may be rather extensive solutions to combat the pilot contamination problem.

Beam-formed control information e.g. enhanced Physical Downlink Control Channel ePDCCH, may be considered. Beam-forming becomes increasingly popular and capable and therefore it may be natural to use it not only for transmission of data but also for transmission of control information. This may be one motivation behind the relatively new control channel in LTE known as ePDCCH. When the control channel is beam-formed the cost of transmitting the overhead control information can be reduced due to the increased link budget provided by the additional antenna gain. This may be a good property that is to be utilized also for 5G, perhaps to an even larger degree than what is possible in the current LTE standard.

When new NX nodes are introduced in an existing LTE network, the NX nodes either (a) may need to be directly configured by the OAM system or (b) may need to transmit additional system/node information related reference signals, in order to establish base station relations as described earlier. In the former case, i.e. OAM based planning, the planning tool may need to be very advanced and/or complex in order to e.g. consider the beam forming capabilities of all the NX nodes, the propagation environments of their deployment etc. In the latter case, i.e. additional system/node information reference signal transmission, the ultra-lean design principle of NX technology may be violated.

Additionally, as the network evolves, for instance new nodes may be deployed in the existing serving area, or the propagation environment may change, the old node relations may become outdated and in some cases even no longer be valid. The problem is further aggregated when new possibly mobile base stations are introduced in NX, for example, when buses carry base-stations to better serve the passengers. Hence, it may be desirable a method for establishing these neighbor relations, which is as automated as possible but still keeps any new reference signal transmissions needed therefore to a minimum.

According to one embodiment of the present invention pilot contamination detection is used to perform NX neighbor relation generation. This may be possible since pilot contamination happens whenever a base station can overhear the transmission of sounding signals from an unintended UE, i.e. a wireless communication device is served by a different node. If the unintended UEs reside in nodes other than the said base station, then this implies that there should be neighbor relation between the said base station and the other nodes.

According to at least one embodiment of the present invention, the ANR generation may be performed without interrupting the ongoing services, i.e., as a SON feature. There is no need for any additional pilot transmissions. Additionally the knowledge obtained when using the embodiment according to the present invention can be used to avoid pilot contamination in future. In a deployment where the topology of base stations changes quickly the benefits may be even larger, as the system can operate as normal until pilot contamination occurs and thus we can avoid any always on proactive mechanism to maintain a constantly changing ANR map for the mobile base stations.

Figure 6:
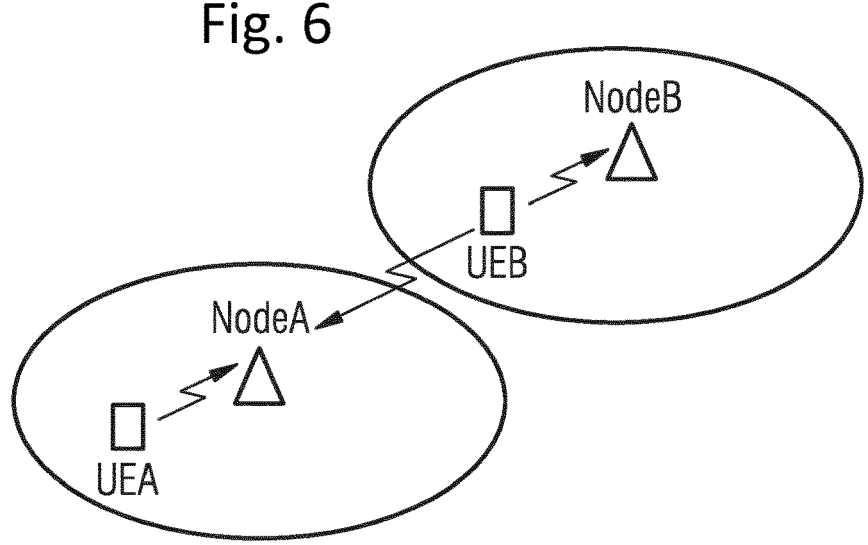
FIG. 6 shows a schematic overview of an exemplary network environment in which a relationship between a first node and at least one second node is determined according to one embodiment of the present invention.
Figure 7:
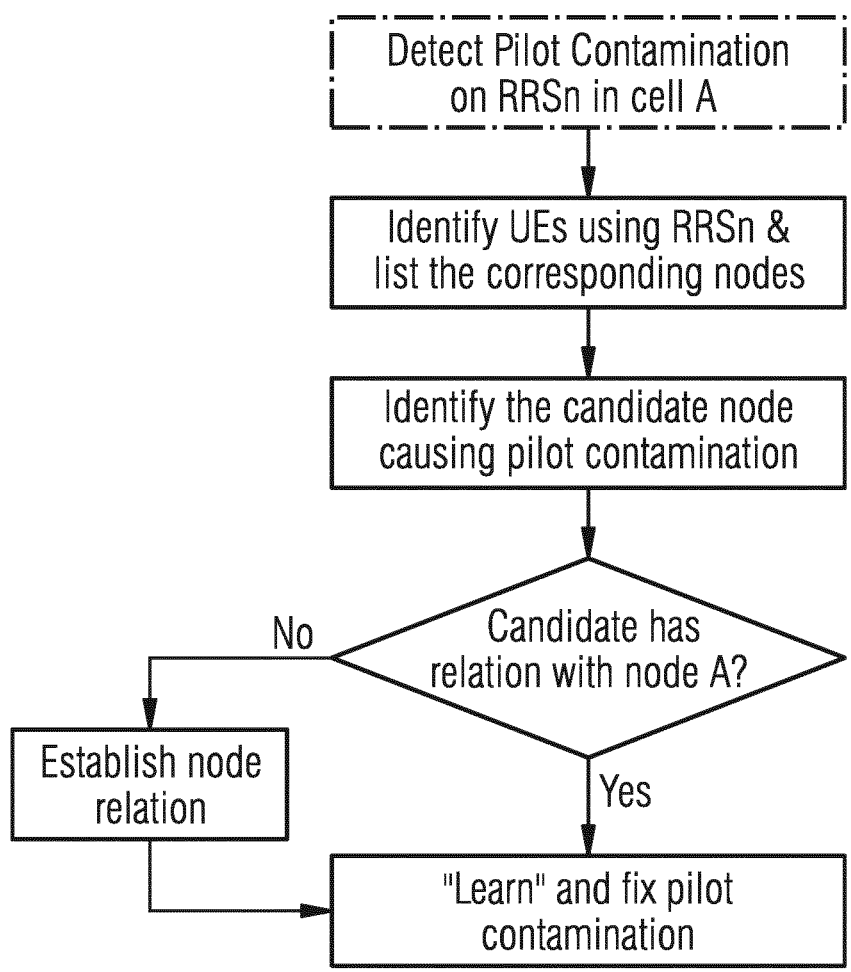
FIG. 7 shows another schematic overview of a method determining a relationship between a first node and at least one second node according to one embodiment of the present invention.

FIG. 6 shows a schematic overview of an exemplary network environment in which a relationship between a first node and at least one second node is determined according to one embodiment of the present invention.

The following flowcharts and exemplary embodiments regarding, how the present invention may be implemented, are depicted in FIGS. 7 to 12.

In FIG. 6, two nodes, NodeA and NodeB, are illustrated each serving two UEs, UEA and UEB respectively. The two UEs may use the same RRS symbols, RRS1, in this example. Since, NodeA may hear the sounding transmission of both UEs, the channel estimation for downlink transmission towards UEA may be contaminated which can be then detected by UEA in the subsequent downlink transmissions.

This can be done using any known prior art solutions. For example UEA may detect that the channel is not flattened by looking at the average channel gain over the transmission bandwidth and/or time duration.

Then UEA may report this along with possibly the corresponding time stamp for this detection to its serving node, i.e. NodeA. NodeA, then may ask the network about the usage of RRS1 at the given time. The NodeB then may reply that a UE in its serving area had used the said RRS. Then the two nodes may check if they have already established a neighbor relation and if not establish the relation.

The information regarding this pilot contamination for example the usage of the given sounding transmission along with possibly the position/location of the UE can be stored for pilot contamination avoidance in future. This procedure is summarized in the flowchart depicted in FIG. 7. Each part will be described in more detail with exemplary embodiments in the following.

Pilot contamination may be detected by any of the active UEs using any prior art technique. For example, a UE might detect that the channel may be not flattened by looking at the channel gain variations in frequency compared to the mean. Once a UE may detect a pilot contamination, it may report it back to its serving node. In some embodiments, the UE may also report the time of pilot contamination detection.

In some embodiments, the UE may also report its position/location if it has access to it.

Once the UE reports the detection of pilot contamination to its serving node, the serving node, knowing the index of the RRS used by the said UE, may ask a central entity for example an OAM for nodes or network entity 110 in which some UE may be using the said RRS during the reported time if available. The OAM may then reply with a list of nodes using the said RRS.

In some embodiments, the ANR tables of the nodes in the list may also be reported to the requesting node.

If only one node replies to the request, then that node may be a candidate. However, since there might be many nodes replying to the request, that is there might be many nodes that have UEs which use the same RRS, there may be a mechanism to pick one or several if needed as the candidates.

Hence, some embodiments relate to how this can be done. In one embodiment, the nodes that are closest in terms of neighbourhood may be selected. That is, a node which is in the ANR table of one of the nodes in the ANR table of the requesting node is selected first and so forth. In some embodiments, there might be a distance threshold for picking a candidate node where the distance may be measured as the number of neighbor hops in the neighbor relation to the current source node.

In some embodiment, there might be another scheme to resolve this issue by for instance requesting all the nodes in the list to enter a phase where each node may try individually to verify whether it needs to establish a neighbor relation to the requesting node or not. This can be done by any standard node relation establishment mechanism. For example, the reporting UE might be asked to transmit up link UL sounding signal and the two nodes in question may then listen and if they can hear the transmission with enough energy then they establish relation. Alternatively, this can be done using downlink DL reference signal transmission by the nodes and asking the reporting UE to report the transmissions that it can hear with enough strength.

It is worth noting that the Listing and Identifying steps can be merged to avoid excessive signaling. That is, in some embodiment the OAM may identify a candidate node and may report this to the requesting node.

Once the node relation is established, one can use this information to avoid pilot contamination. This can be done for instance by allocating orthogonal RRS sequences to the UEs that have used the said RRS sequence. Moreover, if the position of the contaminated UE is known, then this information can be stored such that in the future no other UEs around that location experience pilot contamination.

In the following a flowchart of a method according to one embodiment of the present invention is described then further embodiments on how this can be implemented are described with respect to FIGS. 8 to 12.

Figure 8:
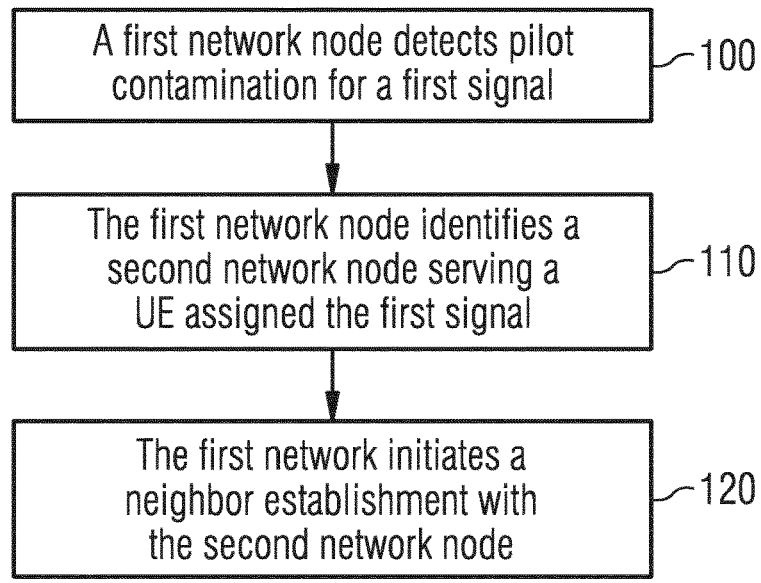
FIG. 8 shows yet another schematic overview of a method determining a relationship between a first node and at least one second node according to one embodiment of the present invention.

In other words according to FIG. 8, a first node may identify pilot contamination for one of the UEs in its serving area. Then the said node may further identify a neighbor node that has a UE which uses the same sounding signal as used by the contaminated UE. Then the first node may establish a neighbor relation with the second node.

Figure 9:
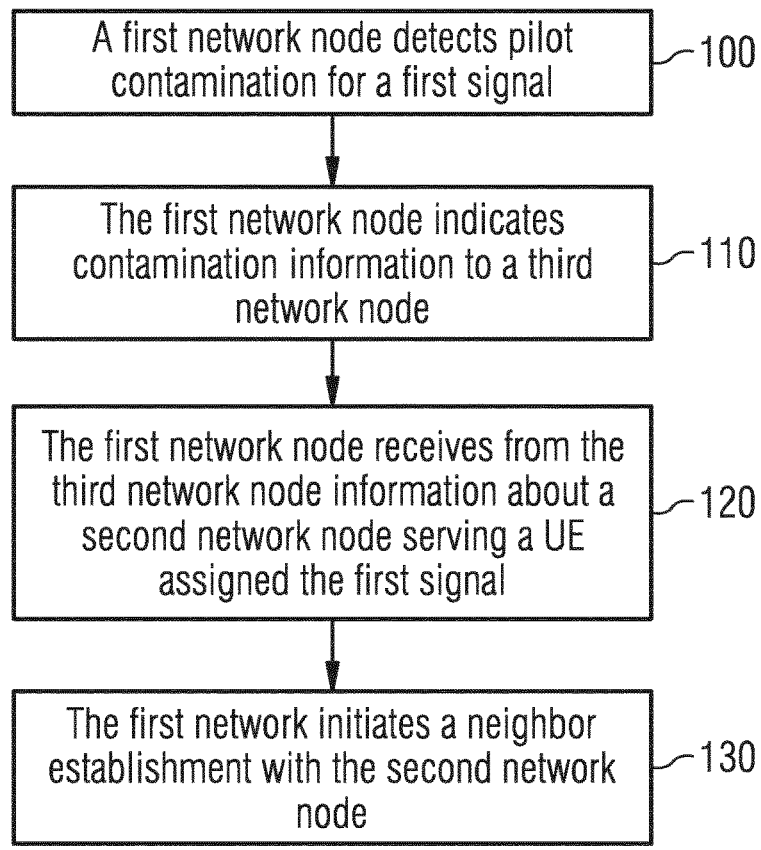
FIG. 9 shows yet another schematic overview of a method determining a relationship between a first node and at least one second node according to one embodiment of the present invention.

In other words according to one embodiment depicted in FIG. 9, a first network node first may detect pilot contamination for one of the UEs in its serving area that uses a given sounding signal. Then, the first node may report this information to a third network node. The third node then may identify a second node which has a UE that uses the said sounding signal. Finally, the first node may establish neighbor relation to the second node.

Figure 10:
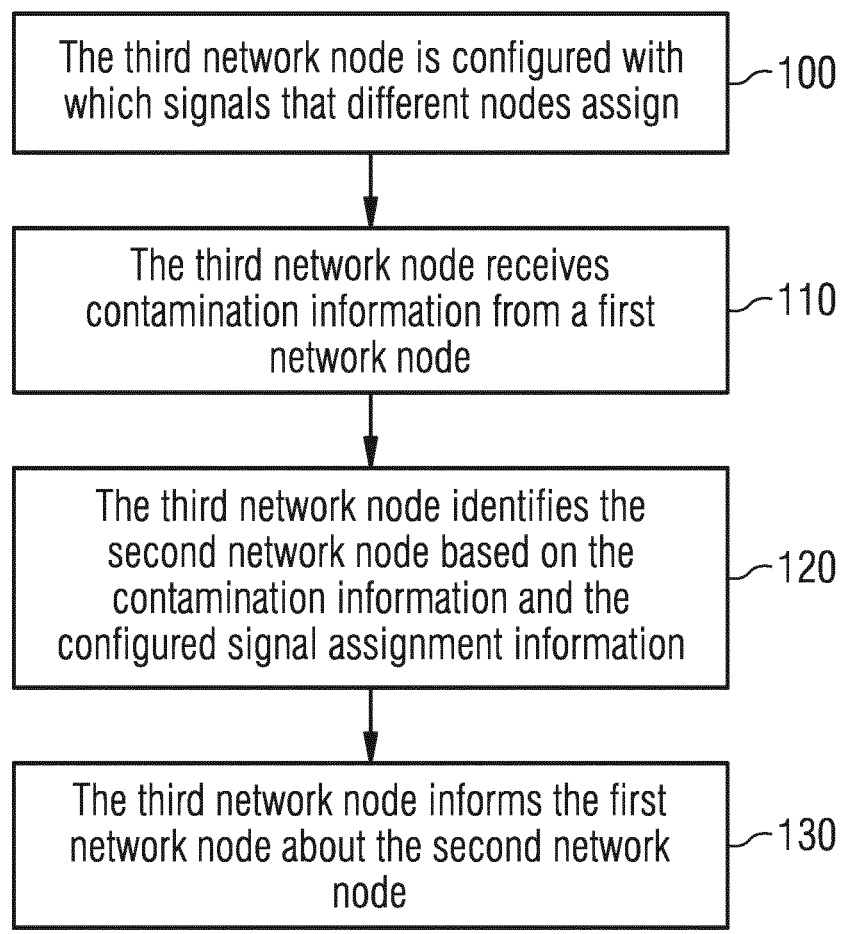
FIG. 10 shows yet another schematic overview of a method determining a relationship between a first node and at least one second node according to one embodiment of the present invention.

In other words according to one embodiment of the present invention shown in FIG. 10, a third network node may be provided with the information about sounding signals used in different nodes. Then, the said network node, upon reception of pilot contamination information from the first node, may identify a second node causing pilot contamination and may forward this information to the first node. The first node may then establish neighbor relation with the second node.

Figure 11:
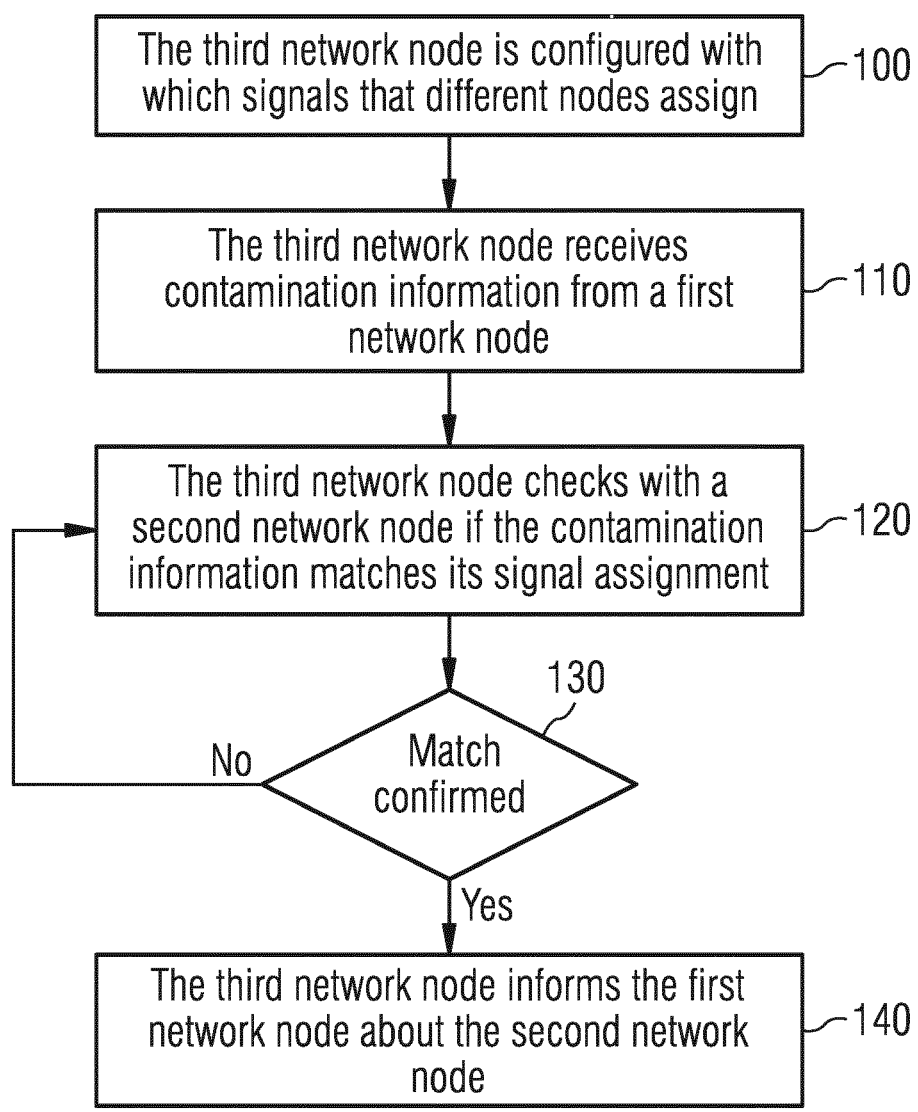
FIG. 11 shows yet another schematic overview of a method determining a relationship between a first node and at least one second node according to one embodiment of the present invention.
Figure 12:
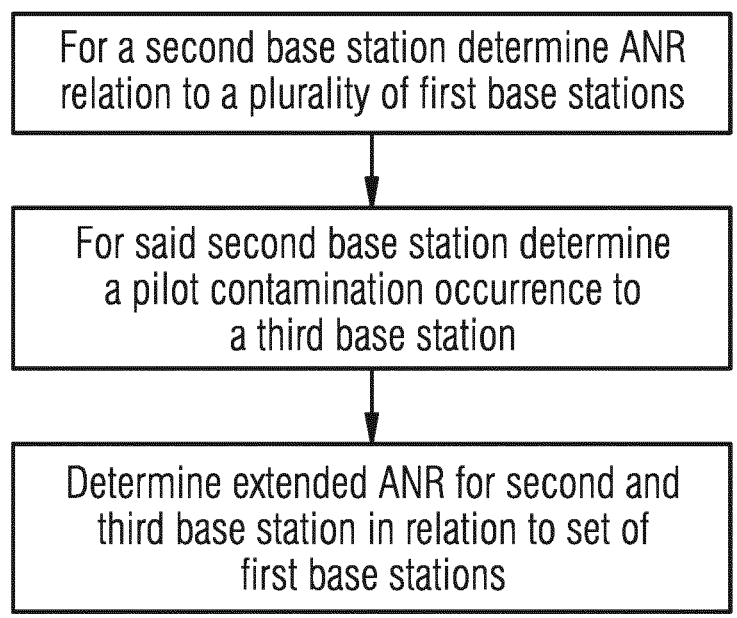
FIG. 12 shows yet another schematic overview of a method determining a relationship between a first node and at least one second node according to one embodiment of the present invention.

In other words according to one embodiment of the present invention illustrated in FIG. 11, a third node may be provided with the sounding signals used by a plurality of network nodes. Upon detection of pilot contamination by a first network node, the third network node may verify if a second node has caused the pilot contamination and if so may inform the first node about this. Then the first node may establish neighbor relation with the second node.

In a further embodiment of the present invention there might be two levels of ANR, first ANR that is almost static and second ANR that is rather dynamic. The first ANR may be related to a first set of base stations that are fixed, i.e., for which ANR tables are static. But further there may be a second set of base stations having a second ANR that is dynamically changing due to the changing environment for example when the base stations are moving. The second ANR table might be a super-set of the first ANR table. In this case typically the ANR relation to the fixed base stations may be enough, but sometimes two mobile base stations may be close to each other and need an ANR relation to better coordinate said two mobile base stations, this may be done as described in FIG. 12, where the ANR tables of the said two mobile base stations are further extended.

In other words, there may be two sets of base stations: one fixed, their node relations do not change or change very slowly over time, and one whose relations are changing more rapidly compared to the first set for example in the case that there are moving base stations. Then as soon as one moving base station detects a pilot contamination towards a third node, its ANR list may be extended by the ANR list of the third.

In one embodiment the pilot contamination is detected from may be a data signal or a reference signal if available as nodes in 5G may not transmit downlink pilots, since the channel estimation is done via uplink pilots and using downlink and uplink reciprocity.

In other words, pilot contamination may happen when uplink reference signals are shared between different users. This may make the channel estimate for one user contaminated with the channel from another user using the same uplink pilots. The result may be that the performance is not as expected, since base stations do not have perfect channel state information. If the base stations may use some sort of interference nulling algorithm for example zero forcing precoding, then the result of pilot contamination may be that the downlink transmissions will interfere with each other. However, interference might exist even when there is no pilot contamination. For example in case of maximum ratio transmission, the base station for each user may pick the precoder that is in the same direction as the channel of the user to maximize the received energy for that user, regardless of how much interference it may cause to other users.

In other words pilot contamination may be detected for a signal transmitted by the first node. The easiest way to detect pilot contamination may be to check for channel hardening. Channel hardening may be that the effective SINR of the channel is approximately equal to its average value. Hardening may be essentially a consequence of the law of large numbers and typically may occur if the elements in the channel vector are independent and identically distributed, e.g. independent Rayleigh fading. This may be regardless of which precoder is used. Even for MRT precoder, the channel would harden as the interference caused by other users may tend to a static value depending on how many users are multiplexed. Thus, the easiest may be that the terminal measures the magnitude of the effective channel gain either, as determined from measurements on downlink pilots or blindly from data. The terminal then may compute the variability of this effective channel gain over time and/or frequency and may report this time/frequency variability back to the base station. If the time/frequency variability is small, it may mean that the channel has a tendency to harden; if the variability is high it may mean that the channel does not have a tendency to harden.

Other ways to detect pilot contamination may be to check for any degradation of performance. For example if there are DL pilots, those may be used to detect if the performance is as expected for example if the signal energy is above a threshold. Also, other more complicated schemes may be used. For example, looking at signal constellation over time and frequency may be applied. If the constellation is distorted, this may indicate pilot contamination.

Although detailed embodiments have been described, these only serve to provide a better understanding of the invention defined by the independent claims and are not to be seen as limiting.

The invention claimed is:

1. A method of operation by a first base station of a wireless communication network, the method comprising:
receiving an indication from a first user equipment served by the first base station that a downlink channel gain determined by the first user equipment for a downlink transmission from the first base station is characteristic of pilot contamination of a pilot signal received from the first user equipment at the first base station, pilot contamination referring to interfering use of the pilot signal by another user equipment and the indication comprising an index of the pilot signal;
in response to the indication, sending a query to a network node of the wireless communication network, inquiring about the interfering use of the pilot signal, and receiving a reply indicating at least two base stations serving respective user equipment responsible for interfering use of the pilot signal; and
in response to determining that the first base station does not have a neighboring relationship established with the at least two base stations, establishing a neighboring relationship with a base station of the at least two base stations based on a number of neighbor hops in a neighbor relation to the first base station.

2. The method of claim 1, further comprising, prior to receiving the indication from the first user equipment, receiving the pilot signal from the first user and using the pilot signal as received at the first base station to estimate a downlink channel between the first base station and the first user equipment, and performing the downlink transmission in dependence on the estimated downlink channel.

3. The method of claim 1, wherein the query about the interfering use of the pilot signal indicates the pilot signal and a time at which the pilot contamination occurred.

4. The method of claim 1, wherein establishing the neighboring relationship with the base station of the at least two base stations comprises communicating with the base station of the at least two base stations, to establish a handover relationship with the base station of the at least two base stations, for handing over wireless communication devices between the first base station and the base station of the at least two base stations.

5. The method of claim 1, wherein establishing the neighboring relationship with the base station of the at least two base stations comprises coordinating pilot-signal allocations with the base station of the at least two base stations, to avoid interfering pilot-signal usage as between user equipments served by the first base station and user equipments served by the base station of the at least two base stations.

6. The method of claim 1, further comprising extending an Automatic Neighbor Relations (ANR) table at the first base station with one or more entries of an ANR table at the base station of the at least two base stations, wherein the ANR tables at the first base station and the base station of the at least two base stations identify respectively neighboring base stations.

7. The method of claim 1, wherein the first base station has one or more known neighboring base stations, and wherein the reply indicates a plurality of base stations, each serving a respective user equipment that uses the pilot signal and, therefore, is potentially responsible for the conflicting use, and identifying one among the plurality of base stations as said base station of the at least two base stations, based on determining which one among the plurality of base stations is a known neighbor of any of the one or more known neighbors of the first base station.

8. A method of operation by a network node configured for operation in a wireless communication network, the method comprising:
receiving a report from a first base station of the wireless communication network, indicating pilot contamination at the first base station for a pilot signal received at the first base station, wherein the first base station allocated the pilot signal to a first user equipment served by the first base station and the report indicates the pilot signal, an index of the pilot signal and a time associated with the pilot contamination;
determining, based on the indicated pilot signal, the index of the pilot signal and the indicated time, at least two base stations serving respective user equipment responsible for interfering use of the pilot signal that made a conflicting allocation of the pilot signal to a second user equipment served by the at least two base stations; and
initiating establishment of a neighbor relationship between the first base station and a base station of the at least two base stations based on a number of neighbor hops in a neighbor relation to the first base station.

9. The method of claim 8, wherein, when more than one other base station made conflicting allocations of the pilot signal to respective user equipments, identifying the base station of the at least two base stations comprises using neighbor-list information or location information, to identify a particular one of the more than one other base stations as said base station of the at least two base stations.

10. A base station configured for operation in a wireless communication network and referred to as a first base station, the first base station comprising:
radio circuitry; and
processing circuitry configured to:
receive, via the radio circuitry, an indication from a first user equipment served by the first base station that a downlink channel gain determined by the first user equipment for a downlink transmission from the first base station is characteristic of pilot contamination of a pilot signal received from the first user equipment at the first base station, pilot contamination referring to interfering use of the pilot signal by another user equipment and the indication comprising an index of the pilot signal;
in response to the indication, send a query to a network node of the wireless communication network, inquiring about the interfering use of the pilot signal, and receiving a reply indicating at least two base stations serving respective user equipment responsible for interfering use of the pilot signal; and
in response to determining that the first base station does not have a neighboring relationship established with the at least two base stations, establish a neighboring relationship with a base station of the at least two base stations based on a number of neighbor hops in a neighbor relation to the first base station.

11. The first base station of claim 10, wherein, prior to receiving the indication from the first user equipment, the processing circuitry is configured to receive, via the radio circuitry, the pilot signal from the first user and use the pilot signal as received at the first base station to estimate a downlink channel between the first base station and the first user equipment, and perform the downlink transmission in dependence on the estimated downlink channel.

12. The first base station of claim 10, wherein the query about the interfering use of the pilot signal indicates the pilot signal and a time at which the pilot contamination occurred.

13. The first base station of claim 10, wherein establishing the neighboring relationship with the base station of the at least two base stations comprises establishing a handover relationship with the base station of the at least two base stations, for handing over wireless communication devices between the first base station and the base station of the at least two base stations.

14. The first base station of claim 10, wherein establishing the neighboring relationship with the base station of the at least two base stations coordinating pilot-signal allocations as between user equipments served by the first base station and user equipments served by the base station of the at least two base stations, to maintain orthogonal allocations as user equipments served by the first base station and user equipments served by the base station of the at least two base stations.

15. The first base station of claim 10, wherein the processing circuitry is configured to extend an Automatic Neighbor Relations (ANR) table at the first base station with one or more entries of an ANR table at the base station of the at least two base stations, wherein the ANR tables at the first base station and the base station of the at least two base stations identify respectively neighboring base stations.

16. The first base station of claim 10, wherein the first base station has one or more known neighboring base stations, and wherein the reply indicates a plurality of base stations, each serving a respective user equipment that uses the pilot signal and, therefore, is potentially responsible for the conflicting use, and wherein the processing circuitry is configured to identify one among the plurality of base stations as said base station of the at least two base stations, based on determining which one among the plurality of base stations is a known neighbor of any of the one or more known neighbors of the first base station.

* * * * *